(12) United States Patent
Hoang et al.

(10) Patent No.: US 11,087,525 B2
(45) Date of Patent: Aug. 10, 2021

(54) UNSUPERVISED LEARNING OF THREE DIMENSIONAL VISUAL ALPHABET

(71) Applicant: INTERNATIONAL BUSINESS MACHINES CORPORATION, Armonk, NY (US)

(72) Inventors: Thanh Lam Hoang, Kildare (IE); Albert Akhriev, Mulhuddart (IE); Ngoc Minh Tran, Dublin (IE); Bradley Eck, Mulhuddart (IE); Tuan Dinh, Madison, WI (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/737,718

(22) Filed: Jan. 8, 2020

(65) Prior Publication Data
US 2021/0209833 A1 Jul. 8, 2021

(51) Int. Cl.
*G06T 15/08* (2011.01)
*G06N 3/08* (2006.01)

(52) U.S. Cl.
CPC .............. *G06T 15/08* (2013.01); *G06N 3/088* (2013.01); *G06T 2200/04* (2013.01); *G06T 2207/20081* (2013.01)

(58) Field of Classification Search
CPC ........... G06T 15/08; G06T 2207/20081; G06T 2200/04; G06N 3/088
See application file for complete search history.

(56) References Cited

U.S. PATENT DOCUMENTS

| 6,112,198 | A | 8/2000 | Lohman et al. |
| 6,125,370 | A | 9/2000 | Courter et al. |
| 7,530,073 | B1 | 5/2009 | Shutt et al. |
| 7,562,090 | B2 | 7/2009 | Lohman et al. |
| 7,750,926 | B2 | 7/2010 | Lonsing |
| 7,779,010 | B2 | 8/2010 | McGarvey |
| 7,912,288 | B2 | 3/2011 | Winn et al. |
| 7,921,424 | B2 | 4/2011 | Shutt et al. |
| 8,156,304 | B2 | 4/2012 | Friedman et al. |
| 8,676,753 | B2 | 3/2014 | Sivasubramanian et al. |
| 9,053,167 | B1 | 6/2015 | Swift et al. |
| 9,740,742 | B2 | 8/2017 | Duffy et al. |
| 10,255,522 | B2 | 4/2019 | Pinheiro et al. |
| 10,268,726 | B1 | 4/2019 | Schiesser |

(Continued)

FOREIGN PATENT DOCUMENTS

WO 2014205231 A 12/2014

OTHER PUBLICATIONS

Liu, "Learning probabilistic representation of shape recognition from volumetric grid", 2017 IEEE International Conference on Robotics and Biomimetics (ROBIO), Dec. 2017, p. 700-705 (Year: 2017).*

(Continued)

*Primary Examiner* — Maurice L. McDowell, Jr.
(74) *Attorney, Agent, or Firm* — Griffiths & Seaton PLLC

(57) ABSTRACT

Embodiments for intelligent unsupervised learning of visual alphabets by one or more processors are described. A visual three-dimensional (3D) alphabet may be learned from one or more images using a machine learning operations. A set of 3D primitives representing the visual 3D alphabet may be provided.

15 Claims, 12 Drawing Sheets

(56) References Cited

U.S. PATENT DOCUMENTS

| | | | |
|---|---|---|---|
| 10,289,903 | B1 | 5/2019 | Chandler et al. |
| 10,332,315 | B2 | 6/2019 | Samec et al. |
| 10,467,495 | B2 * | 11/2019 | Liu ................. G06K 9/4628 |
| 2002/0126138 | A1 | 9/2002 | Shekter |
| 2017/0300767 | A1 | 10/2017 | Zou et al. |
| 2018/0026867 | A1 | 1/2018 | Mcalister et al. |
| 2020/0183046 | A1 * | 6/2020 | Wheelock ............ G06N 20/10 |
| 2020/0184711 | A1 * | 6/2020 | Choi .................. G06N 3/08 |
| 2020/0250540 | A1 * | 8/2020 | Mehr .................. G06F 30/17 |

OTHER PUBLICATIONS

"3D-PRNN: Generating Shape Primitives with Recurrent Neural Network" Zou et al. Aug. 4, 2017 arXiv:1708.01648 (1 Page).

"A new paradigm for computer vision based on compositional representation" Vinjai Vale MIT Primes May 14, 2018 (24 Pages).

"Acquisition of Visual Shape Primitives" Shams et al. vol. 42, Issue 17, Aug. 2002, pp. 2105-2122.

Ahmed, E. et al.; "A Survey on Deep Learning Advances on Different 3D Data Representations" Ahmed et al. arXiv:1808.01462v2 [cs.CV] Apr. 6, 2019 (35 Pages).

"Deep Convolutional Inverse Graphics Network." Tejas D. Kulkarni et al. arXiv:1503.03167v4 [cs.CV] Jun. 22, 2015 (10 Pages).

HoloGAN: "Unsupervised learning of 3D representations from natural images." Thu Nguyen-Phuoc et al. arXiv:1904.01326v2 [cs.CV] Oct. 1, 2019.

IPCOM000252007D; "Image Moderation Using Machine Learning" Authors: Dave Feltenberger, Rob Neuhaus Dec. 7, 2017 Defensive Publication Series (35 Pages).

IPCOM000252094D; "Correcting Image Anomalies Using Machine Learning" Nick Felker Dec. 12, 2017 Defensive Publications Series (36 Pages).

"Learning Shape Abstractions by Assembling Volumetric Primitives" Tulsiani et al. (9 Pages), year, 2017.

"Learning to See Physics via Visual De-animation" Wu et al 31st Conference on Neural Information Processing Systems (NIPS 2017), Long Beach, CA, USA (12 Pages).

"Multi-Object Representation Learning with Iterative Variational Inference" Greff et al. arXiv:1903.00450v2 [cs.LG] May 15, 2019 (27 Pages).

"Neural Scene Representation and Rendering" Blog Post Research, Jun. 14, 2018 (10 Pages).

PCPNET: "Learning Local Shape Properties from Raw Point Clouds" arXiv:1710.04954v4 [cs.CG] Jun. 19, 2018 (11 Pages).

RenderNet: "A deep convolutional network for differentiable rendering from 3D shapes" 32nd Conference on Neural Information Processing Systems (NeurIPS 2018), Montréal, Canada ( 11 Pages).

"Vision-as-Inverse-Graphics: Obtaining a Rich 3D Explanation of a Scene from a Single Image" Lukasz Romaszko, Christopher K. I. Williams, Pol Moreno, Pushmeet Kohli; The IEEE International Conference on Computer Vision (ICCV), 2017, pp. 851-859.

Weng, JJ. et al.; "Learning Recognition and Segmentation of 3-D Objects From 2-D Images" 1993 (8 Pages).

Kish, AV.; "Efficient Partitioning and Allocation of Data for Workflow Compositions", (Doctoral dissertation) https://scholarcommons.sc.edu/etd/3824, 2016 (128 Pages).

Pavlo, A. et al.; "Skew-aware Automatic Database Partitioning in Shared-nothing, Parallel OLTP Systems", https://dl.acm.org/doi/abs/10.1145/2213836.2213844, May 2012.

"Efficient Application Partitioning within a Cluster Implementing High Availability", IPCOM000237834D; Jul. 16, 2014 (4 Pages).

"Reliable, Scalable, and High-Performance Distributed Storage: Distributed Object Storage", IPCOM000234957D; Feb. 19, 2014 (11 Pages).

"Method and System Assigning Clustered Data to Database Partitions without Data Redistribution", IPCOM000186372D; Aug. 17, 2009 (5 Pages).

* cited by examiner

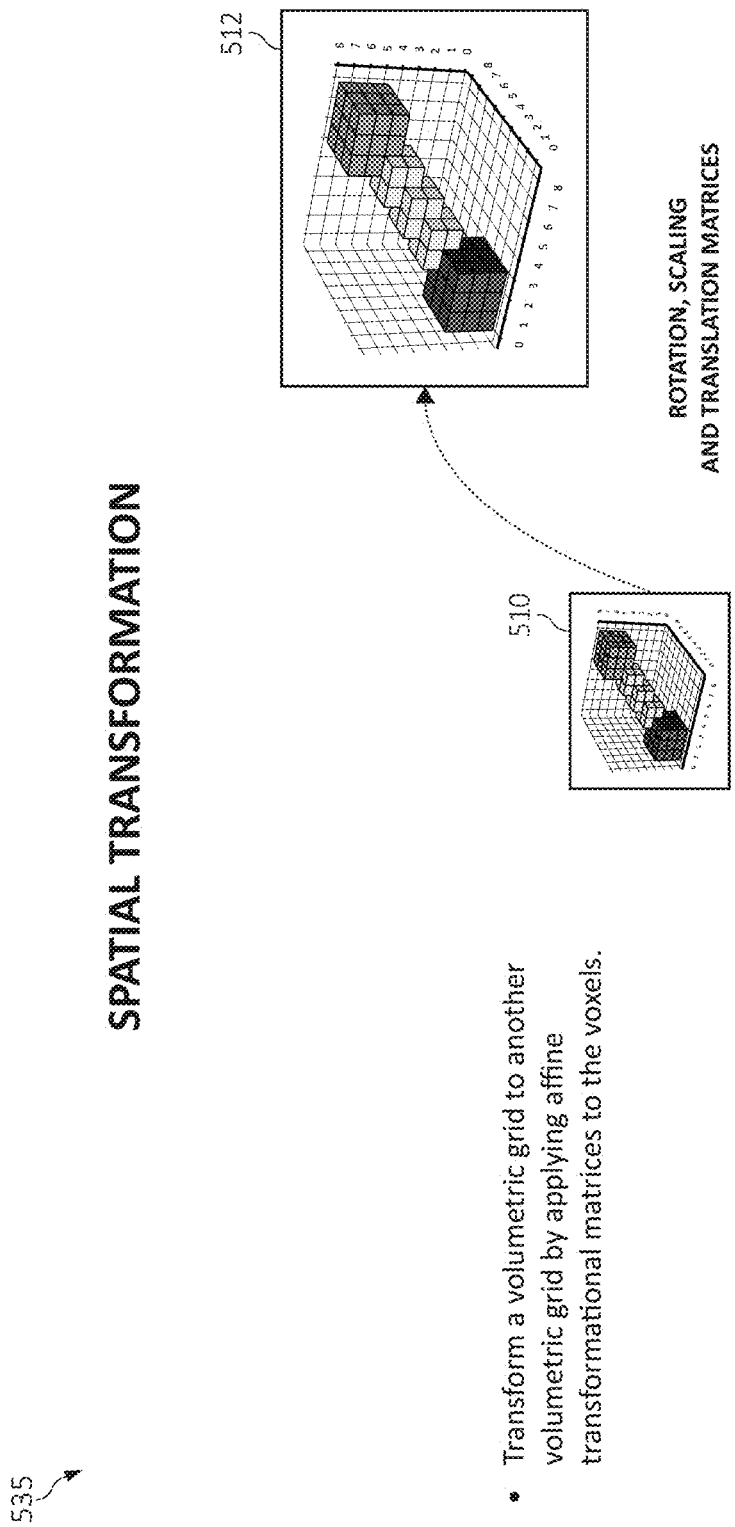

ShaderNet

- A neural network
- Get input as: a voxel grid, camera, lights, texture, and materials
- Output a single image which is a projected image in the camera projection plane

CAMERA, LIGHTS, TEXTURE AND MATERIALS

NEURAL NETWORK

V_COLOR

US 11,087,525 B2

UNSUPERVISED LEARNING OF THREE DIMENSIONAL VISUAL ALPHABET

BACKGROUND OF THE INVENTION

Field of the Invention

The present invention relates in general to computing systems, and more particularly, to various embodiments for providing unsupervised learning of three dimensional ("3D") visual alphabets.

Description of the Related Art

Generally, "computer vision" refers to the use of computers (or computing devices, systems, etc.) to gain an understanding of (e.g., analyze, process, acquire, etc.) images (e.g., digital images), including both still/static images and videos (or video frames). In contrast, "computer graphics" generally refers to creating images and/or videos (e.g., scene rendering) using computers such as, for example, producing images from three dimensional ("3D") models. Thus, in a sense, computer graphics is an inversion (or the opposite) of computer vision.

Recent trends in utilizing deep learning (and/or machine learning, artificial intelligence ("AI") analysis, etc.) have led to attempts to utilize computer graphics techniques to improve computer vision tasks. For example, as computer graphics is an inversion of computer vision. However, learning 3D representations of objects from video or image data is a current challenge particularly since computer vision are applied in object detections, object tracking, robotics, and augmented and/or virtual reality.

SUMMARY OF THE INVENTION

Various embodiments for providing intelligent unsupervised learning of three dimensional ("3D") visual alphabets by one or more processors are described. In one embodiment, by way of example only, a method for providing intelligent unsupervised learning of visual alphabets, again by one or more processors, is provided. A visual three-dimensional (3D) alphabet may be learned from one or more images using a machine learning operations. A set of 3D primitives representing the visual 3D alphabet may be provided.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 5D is a block diagram of an exemplary spatial transformation operation according to an embodiment of the present invention;

DETAILED DESCRIPTION OF THE DRAWINGS

Figure 1:
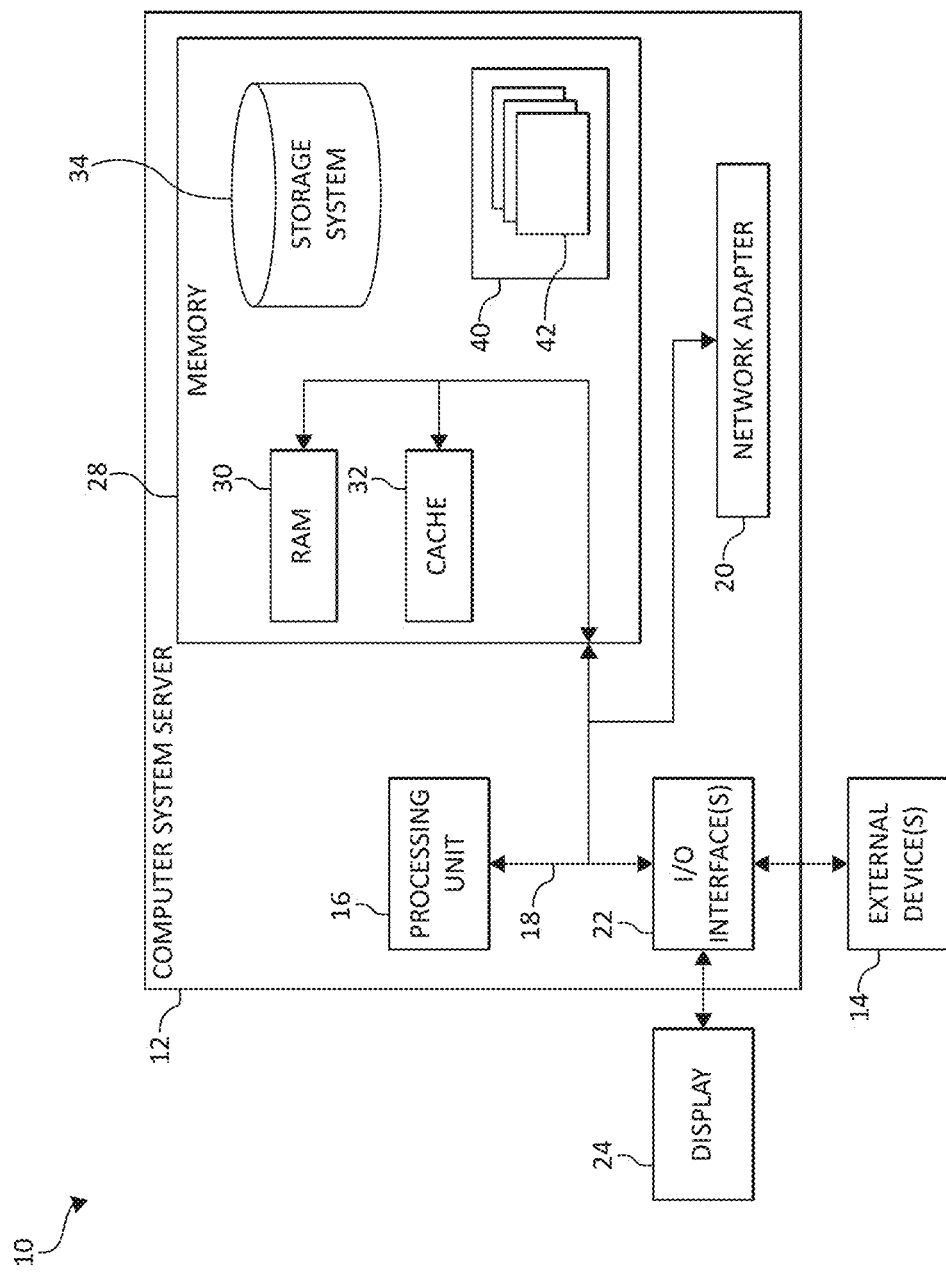
FIG. 1 is a block diagram depicting an exemplary computing node according to an embodiment of the present invention.

As discussed above, generally, "computer vision" may be considered, at least in a sense, to be an inversion (or the opposite) of "computer graphics." More specifically, computer vision refers to the use of computers (or computing devices, systems, etc.) to gain an understanding of (e.g., analyze, process, etc.) images (e.g., digital images), including both still/static images and videos (or video frames). In contrast, "computer graphics" generally refers to creating images and/or videos (e.g., scene rendering) using computers.

In recent years, attempts have been made to utilize deep learning (and/or machine learning, cognitive analysis, etc.) and computer graphics techniques to improve computer vision tasks. For example, since computer graphics is an inversion of computer vision, some attempts have various operations to learn representation for objects in images. However, learning 3D representations of objects from video or image data is a current challenge particularly since computer vision are applied in object detections, object tracking, robotics, and augmented and/or virtual reality. As such, appropriate visual representations of such objects are considerably more complicate.

To address these needs, in some embodiments described herein, methods and/or systems are disclosed that learn, for example, three-dimensional (3D) representations of objects in an unsupervised manner. Thus, the present invention provides for learning, in an unsupervised manner, representations of objects with potentially many applications, such as artificial rendering and object detection and/or tracking. That is, the present invention provides for learning 3D representations of objects from video or images where computer vision is applied in object detections, object tracking, robotics, and augmented and/or virtual reality. Accordingly, the present invention provides for intelligent unsupervised learning of visual alphabets for learning 3D representations of objects from videos, images, or a combination thereof.

In an additional aspect, various embodiments described herein provide for learning a 3D visual alphabet (a set of visual primitives) in an unsupervised manner. In one aspect, compositional transformation showing how a 2D image is created from the 3D visual alphabet may be inferred via a series of spatial transformations before being shaded and projected on a camera space to create the image.

More specifically, the present invention provides for learning a 3D visual alphabet (e.g., a set of primitives in voxel grid format) in an unsupervised manner. A set of videos or images may be received as input and a set of 3D primitives, considered as an alphabet after training, may be provided as the output of a computing system. A 3D representation of an input image may be inferred with the learned 3D visual alphabet. Given the trained alphabet and an input image, the present invention provides (as output) 1) a set of compositional transformation showing spatial transformations and the order in which these transformations are applied to transform visual primitives in the alphabet to create the 3D scene of the given input image, and 2) an estimate of pose information and object properties including object materials, colors and texture, scene lighting information and camera information.

In one aspect, as used herein, a voxel may be a representation of a value on a grid in 3D space. That is, a voxel represents a value, sample or data point on a 3D grid (e.g., a voxel grid). The position of a voxel may be inferred based on its relative position to other voxels (e.g., the voxel's position in a data structure that makes up a single volumetric image). A voxel may be visualized as a cube of unit size having multiple edges of "faces" such as, for example, right, left, front, back, upper and lower faces (e.g., 6 sided cube). A voxel may represent each part of an object (as opposed to just a surface of an object) and may be divided into volumetric structures (e.g., cubes), which may be stored on a grid in 3D space (e.g., voxel space).

As will be appreciated by one skilled in the art, in computer graphics, scene graphs (or graphical scene graphs) are general data structures that arrange the logical and/or spatial representations of graphical scenes and/or the objects within graphical scenes. Scene graphs are often a collection of nodes in a graph or "tree" structure, where each node represents, for example, a part of an object. A tree node may have many children but only a single parent, with the effect of a parent applied to all of its child nodes.

An operation performed on a group automatically propagates its effect to all of its members. In many instances, associating a geometrical transformation (or transformational) matrix at each group level and concatenating such matrices together is an efficient and natural way to process such operations. A root (or world) node may represent the entire object and keep transformational matrices that transform the entire object from local coordinate system to world coordinate system and render the object in a camera space. A common feature is the ability to group related shapes and objects into a compound object that can then be moved, transformed, selected as a single object. Scene graphs are considered to be an efficient representation of objects, irrespective of pose and view (i.e., camera view, the angle from which the object(s) is viewed, etc.).

Using graphical representations of objects in the form of, for example, scene graphs, computer graphics may render or generate images by applying transformational matrices (e.g., rotation, scaling, translation, projection, etc.). In contrast, computer vision typically receives an image as input, and may perform various tasks, such as object detection, localization, and/or tracking and scene classification, using, for example, neural networks (or machine learning, cognitive analyses, etc.) or classical computer vision (e.g., object detection).

In some embodiments, the system (and/or the autoencoder), or at least particular aspects of operation thereof, is trained via an unsupervised learning. As will be appreciated by one skilled in the art, unsupervised learning is a branch of machine learning (or cognitive analysis) that learns from test data that has not been labeled, classified, or categorized. That is, instead of responding to feedback, unsupervised learning identifies commonalities in the data and reacts based on the presence or absence of such commonalities in each new piece of data.

As such, in some embodiments, the methods and/or systems described herein may utilize a "neural network," "intelligent analysis," "intelligent system," "machine learning," "intelligent or cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc., that correspond to, govern, and/or estimate the operation of the system(s), or with respect to the embodiments described herein, the analysis of images as described herein. Utilizing the models, the performance (or operation) of the system (e.g., utilizing/based on new inputs) may be predicted and/or the performance of the system may be optimized by investigating how changes in the input(s) effect the output(s).

It should be understood that as used herein, the term "computing node" (or simply "node") may refer to a computing device, such as a mobile electronic device or a desktop computer, and/or an application, such a chatbot, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by the individuals on such computing devices.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc.. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
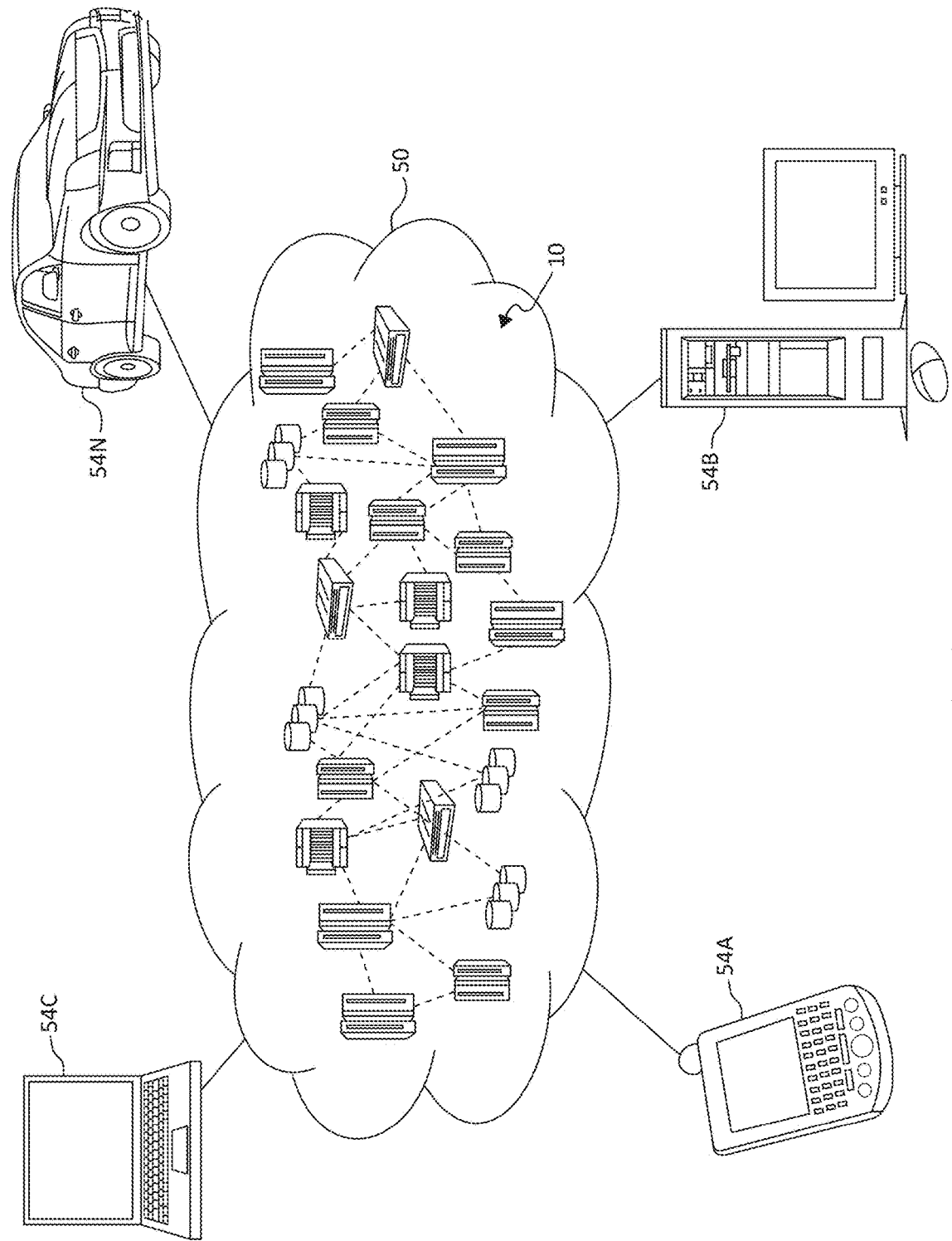
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
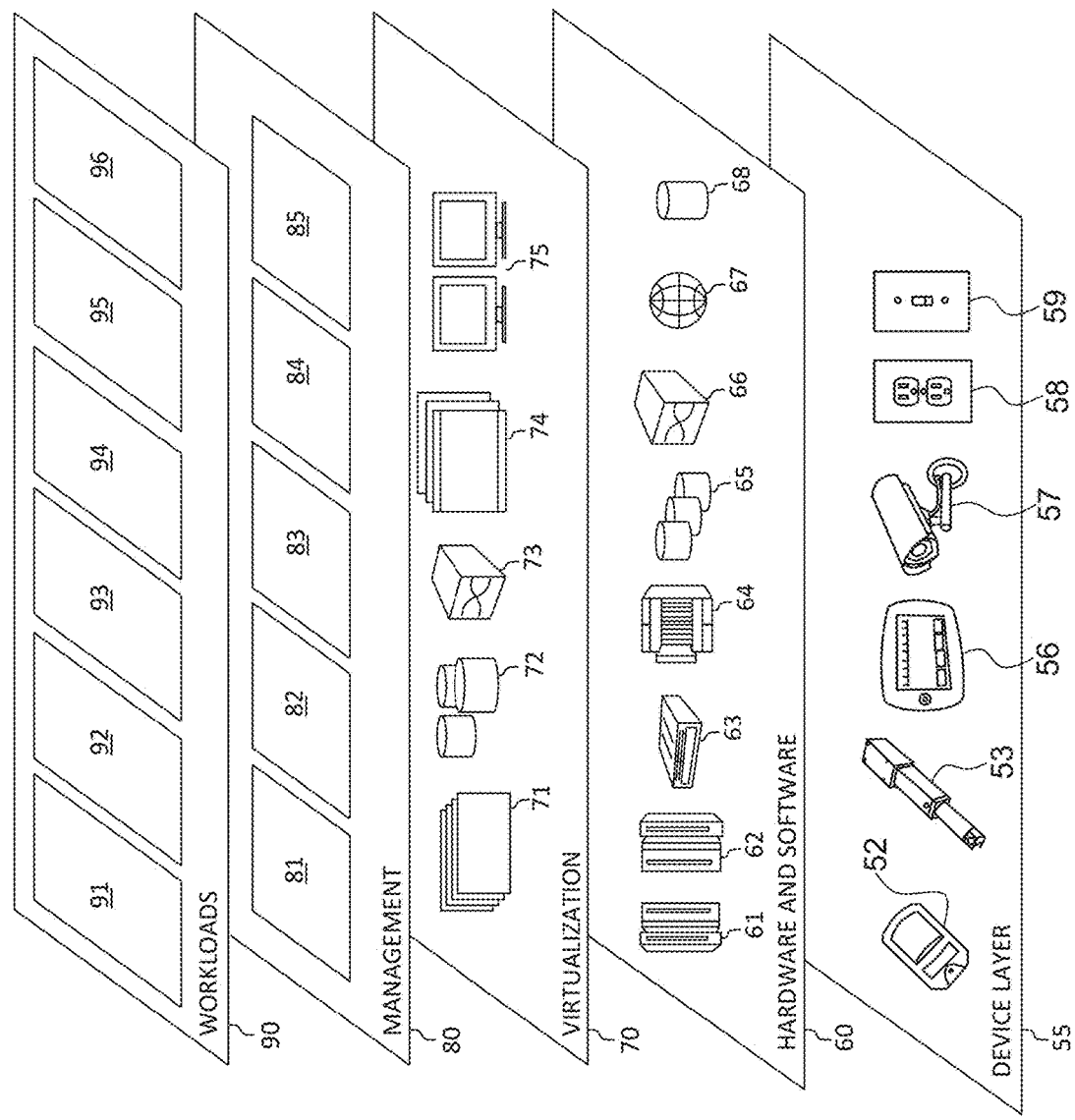
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for analyzing images and/or performing computer vision tasks as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, some embodiments described herein provide methods and systems for analyzing (or processing) images and/or performing computer vision tasks. In some embodiments described herein, a visual 3D visual alphabet (a set of primitives in voxel grid format) may be learned in an unsupervised machine learning operation. The methods and systems takes as input a set of videos or images and then outputs a set of 3D primitives considered as an alphabet following a training operation. A 3D representation of an input image may be inferred with and/or by using the learned alphabet. Based on the trained alphabet and an input image, the present invention may output 1) a set of compositional transformation showing spatial transformations and the order in which these transformations are applied to transform visual primitives in the alphabet to create the 3D scene of the given input image, and/an 2) an estimate of pose information and object properties including object materials, colors and texture, scene lighting information and camera information.

In some embodiments, the decoder receives the scene graph(s) as input and generates (or determines) at least one transformational matrix associated with rendering the object(s) as they appear in the original image. The scene graph rendering engine may receive the transformational matrix (or matrices) and the scene graph(s), and in some embodiments, renders the results as an output (or second) image. The methods and/or systems described herein may (also) be applied to and/or utilized in, for example, object detection, localization, and tracking, as well as scene (or image) classification, other visual recognition services, and video generation.

Figure 4A:
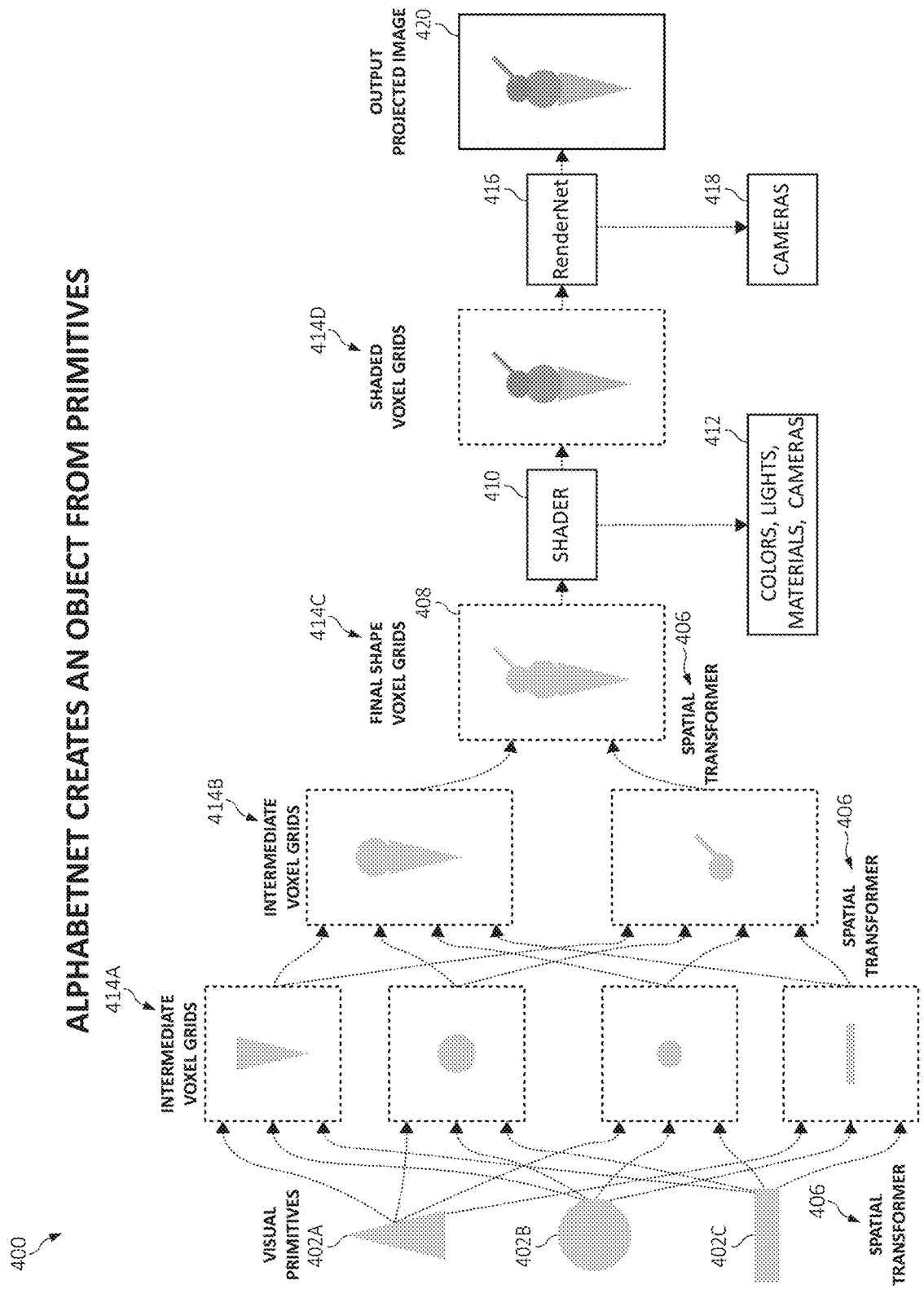
FIG. 4A-4B are a block diagram/flow chart of a system and/or method for providing unsupervised learning of three dimensional ("3D") visual alphabets according to an embodiment of the present invention.
Figure 4B:
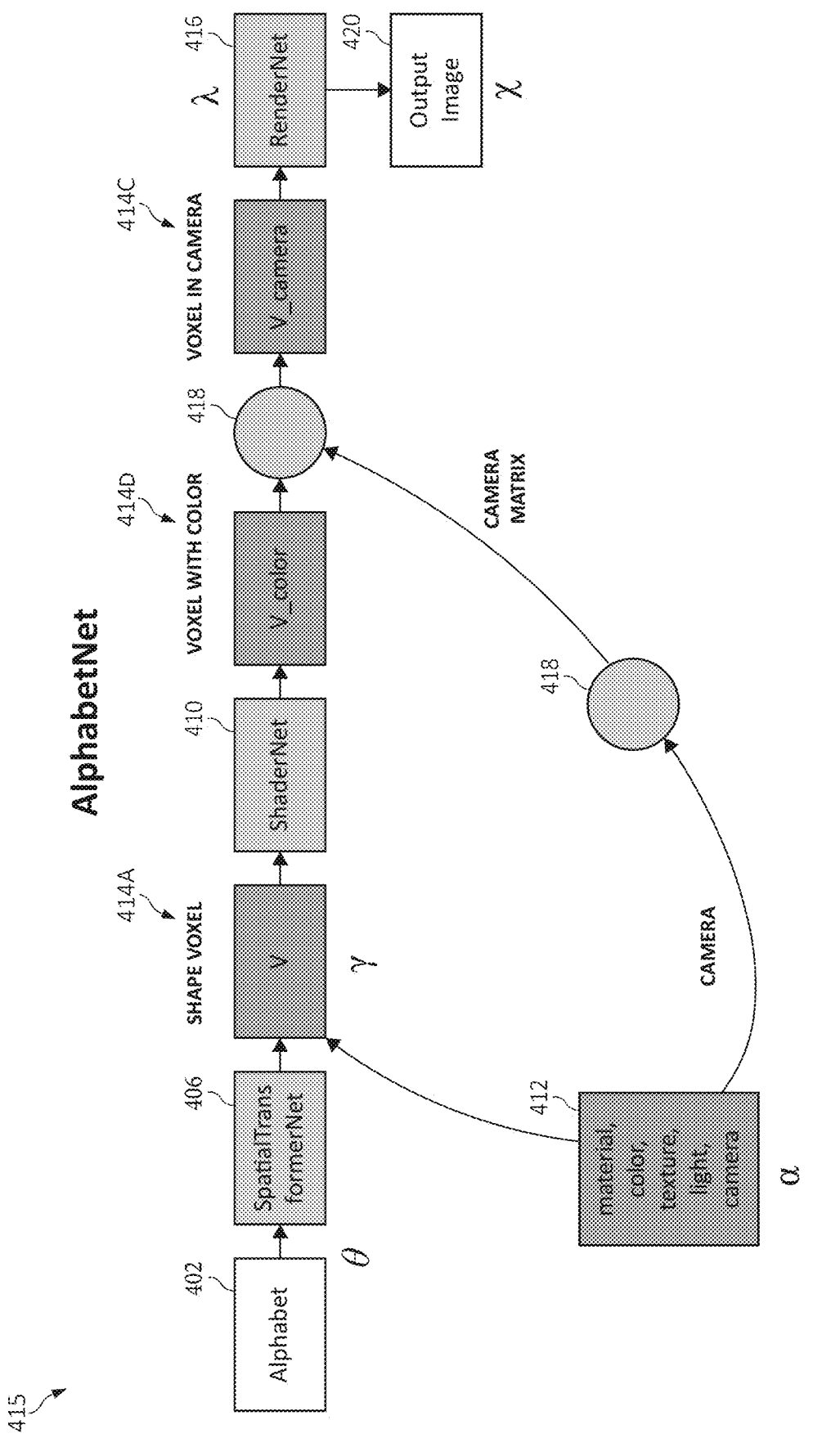

FIGS. 4A-4B are simplified block diagram/flow chart of systems (and/or methods) 400 and/or 415 according to some embodiments described herein. In one aspect, one or more of the components, modules, services, applications, operations, and/or functions described in FIGS. 1-3 may be used in FIGS. 4A-4B. The systems 400 and/or 415 may be a neural network using machine learning operations. The systems 400 and/or 415 may include a spatial transformer 406 (e.g., SpatialTransformationNet), a shader 410 (e.g., ShaderNet), a renderer 416 (e.g., RenderNet), one or more cameras 418, one or more voxel grids (e.g., intermediate voxel grids 414A-B, final shape voxel grid 414C, shaded voxel grid 414D), and/or colors, lights, materials, and cameras 412.

As used herein, an alphabet may be a set of primitives represented as volumetric grids and each voxel grid (e.g., intermediate voxel grids 414A-B, final shape voxel grid 414C, shaded voxel grid 414D) is a tensor (e.g., a volumetric grid is a 3D tensor). Intermediate layers are one or many intermediate volumetric grids (e.g., intermediate voxel grids 414A-B) used to keep intermediate results under spatial transformations. The intermediate layers include a substantial amount of information about the objects, such as poses, perspective, texture, color, and relative positions, as well as 3D representations. A final layer is a single volumetric grid in the last layer representing the 3D scene in the camera space. The systems 400 and 415 may having one or more connections between two volumetric grids and in two consecutive layers there is one connection. A connection is a spatial transformer (e.g., the spatial transformer 406). The spatial transformer 406 transforms one volumetric grid into another one with a set of affine transformation matrices (scaling, rotation and translation). The shader 410 places/puts colors, texture, materials, and/or light information to create color for each voxel in the 3D volumetric grid. The renderer 416 is a neural network that takes input as a 3D volumetric grid, texture, lighting information, object's material and colors and outputs an image.

In one aspect, as depicted in system 400, one or more visual primitives 402A (e.g., a triangle/cone object/image), 402B (e.g., a circle/sphere object/image), and/or 402C (e.g., a rectangular/object/image) may be received as input data. The one or more visual primitives 402A, 402B and/or 402C may be moved or transferred to a voxel grid (e.g., a volumetric grid), such as for example, intermediate voxel grids 414A-C. Each of the one or more visual primitives 402A-402C may be a voxel that is a representation of each primitive. A plurality of connections are provided (e.g., spatial transformers 406) that connect each of the voxel grids together and transform (e.g., scale, rotate, and translate) each of the voxel grids into another voxel grid. For example, a spatial transformation 406 may be transform intermediate voxel grid 414A into intermediate voxel grids 414B and then intermediate voxel grids 414B may be transformed into final voxel grids 414C. Thus, the one or more visual primitives 402A-C may be scaled (e.g., smaller or larger), rotate, and translate (e.g., move to an alternative location) in each voxel grid (e.g., voxel grids 414A-D).

The shader 410 may learn, receive, and/or apply information to the object relating to colors, lighting, material, and camera information 412 to provide a shaded to the one or more visual primitives 402A-C to provide the shaded voxel grid 414D. Thus, the shader 410 may shade the object as the shaded voxel grids 414D (e.g., a shaded 3D volumetric grid) by applying colors, texture, materials, and/or light information to create color for each voxel in the 3D volumetric grid. The renderer 416 may access the camera 418 and determine a selected view and provide, as output, the projected image 420 (a predicted image is generated as the final output).

As depicted in system 400, the visual primitives 402A-C are unknown (e.g., an unknown image) and can be compared to the projected image 420 to minimize the loss (e.g., loss function) between the predicted image and the original image (e.g., the visual primitives 402A-C). However, since the visual primitives 402A-C are unknown, the system 400 may use a machine learning operation (e.g., unsupervised learning) to learn a visual 3D alphabet from one or more images using a set of primitives.

Similarly, as depicted in system 415 of FIG. 4B, an alphabet 402 (e.g., a visual 3D visual alphabet) of a set of primitives represented as volumetric grids (e.g., voxel grids) and each voxel grid that may be learned from one or more images using a machine learning operations. The spatial transformer 406 uses the learned alphabet transforms one volumetric grid into another one with a set of affine transformation matrices (scaling, rotation and translation). That is, the spatial transformer 406 may apply a set of transformations of spatial transformations to transform visual primitives in the visual 3D alphabet.

The spatial transformer 406 may transform the transform (e.g., applying one or more transformational matrices) visual primitives in the visual 3D alphabet into a shape voxel 414A (e.g., an intermediate voxel grid 414A) that may store intermediate visual primitive transformation results from spatial transformation.

The shader 410 may shade the shape voxel 414A by applying colors, texture, materials, and/or light information 412 to create color for the shape voxel 414A to generate the voxel with color 414D voxel with color (e.g., shaded voxel grids 414D).

A camera matrix 414 may be used determine a selected view and provide a voxel in camera 414C. The renderer 416 is a neural network and may determine a selected view and provide, as output, the projected image 420 (a final output image 420). The shader 410 puts colors, texture, materials, and/or light information to create color for each voxel in the 3D volumetric grid. The renderer 416 is a neural network that takes input as a 3D volumetric grid, texture, lighting information, object's material and colors and outputs an image.

Thus, the unsupervised learning of visual alphabets includes receiving as input one or more images and/or videos. During a machine learning training phase, a back-propagation operation is performed to backpropagate the errors between the predicted output images from Alphabet-Net and the input images to learn jointly the primitives, the rendering, the shading, the camera pose, materials, lights, texture, colors and spatial transformation parameters.

Additionally, an estimation operation is performed to estimate the composition, pose, material, and textures. An image and an alphabet with primitives may be received as input. During a machine learning training phase, a back-propagation operation is performed to backpropagate the errors between the predicted output images from Alphabet-Net and the input images to learn jointly a camera pose, materials, lights, texture, colors and spatial transformation parameters.

Thus, the resulting, predicted/output image may then be compared from AlphabetNet and the input images. In some embodiments, training may be performed utilizing, for example, back-propagation algorithms to minimize reconstruction error between input images and output images ($|I-I_0|$).

Figure 5A:
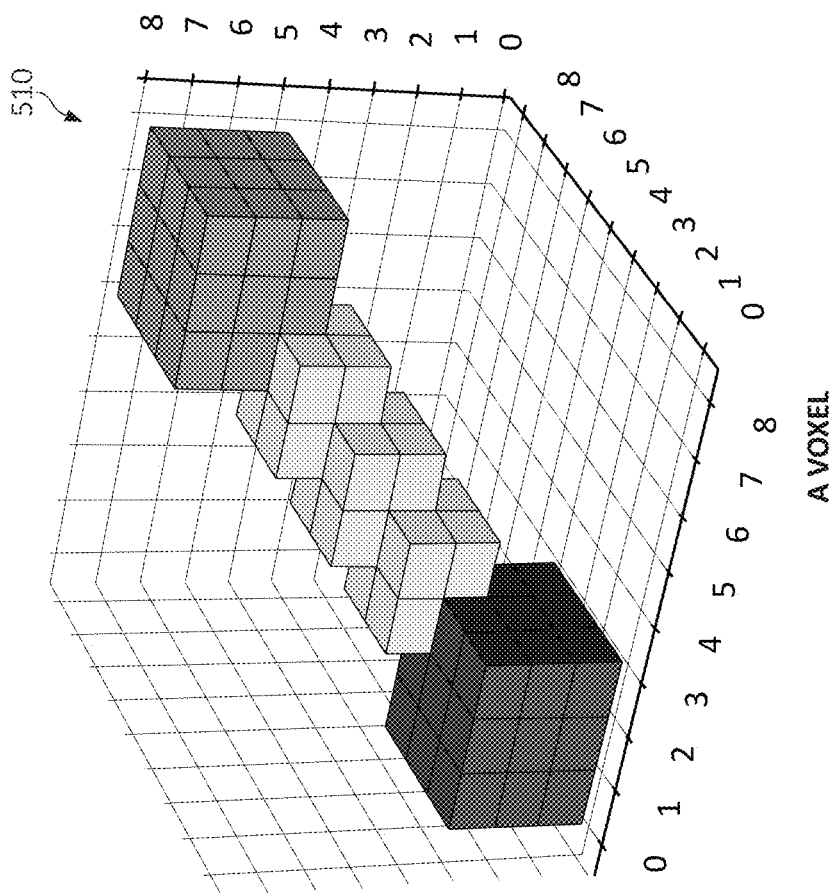
FIG. 5A is a block diagram of an exemplary three dimensional ("3D") visual alphabet according to an embodiment of the present invention.
Figure 5B:
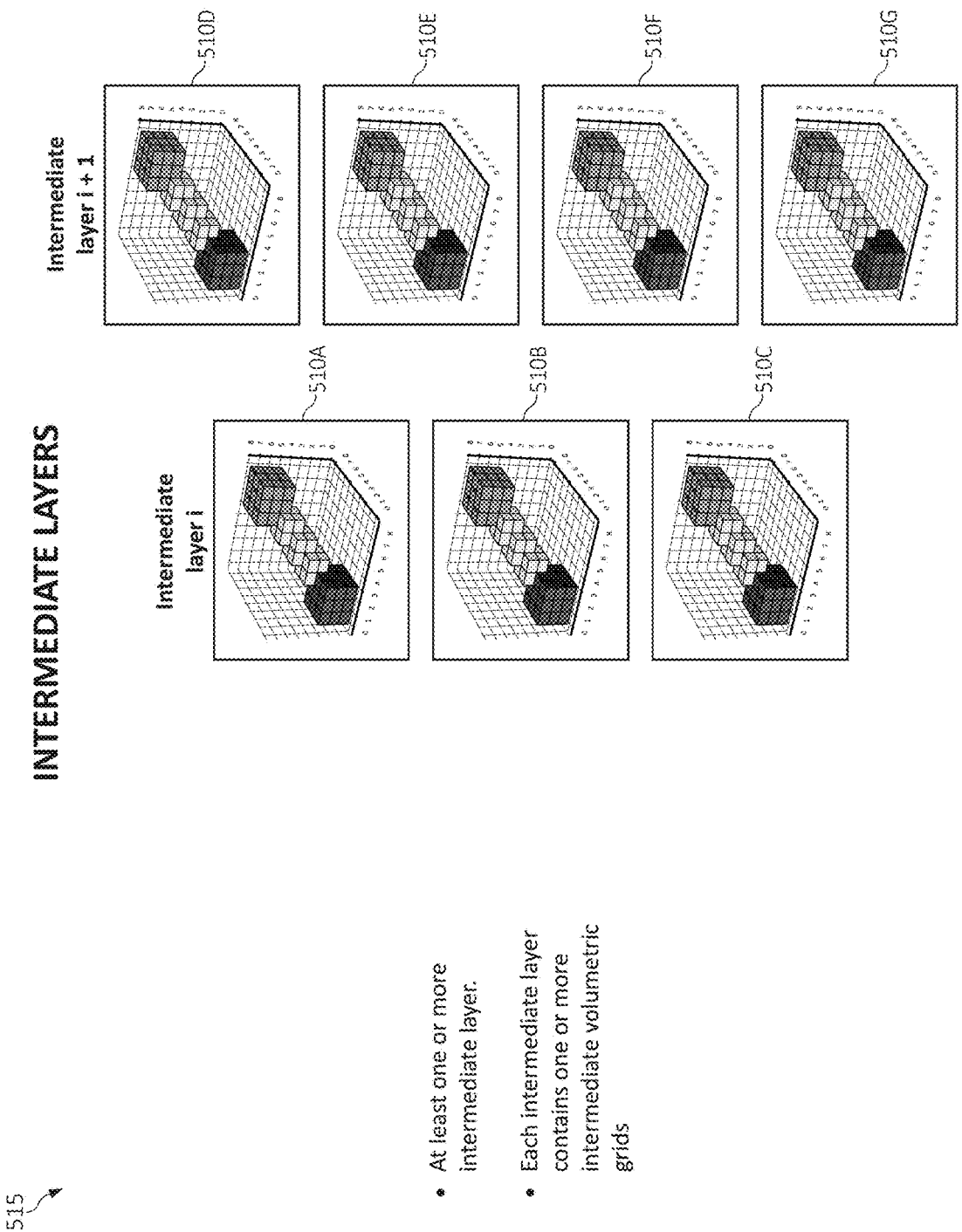
FIG. 5B-5C are block diagrams of an exemplary intermediate layers and connections according to an embodiment of the present invention.
Figure 5C:
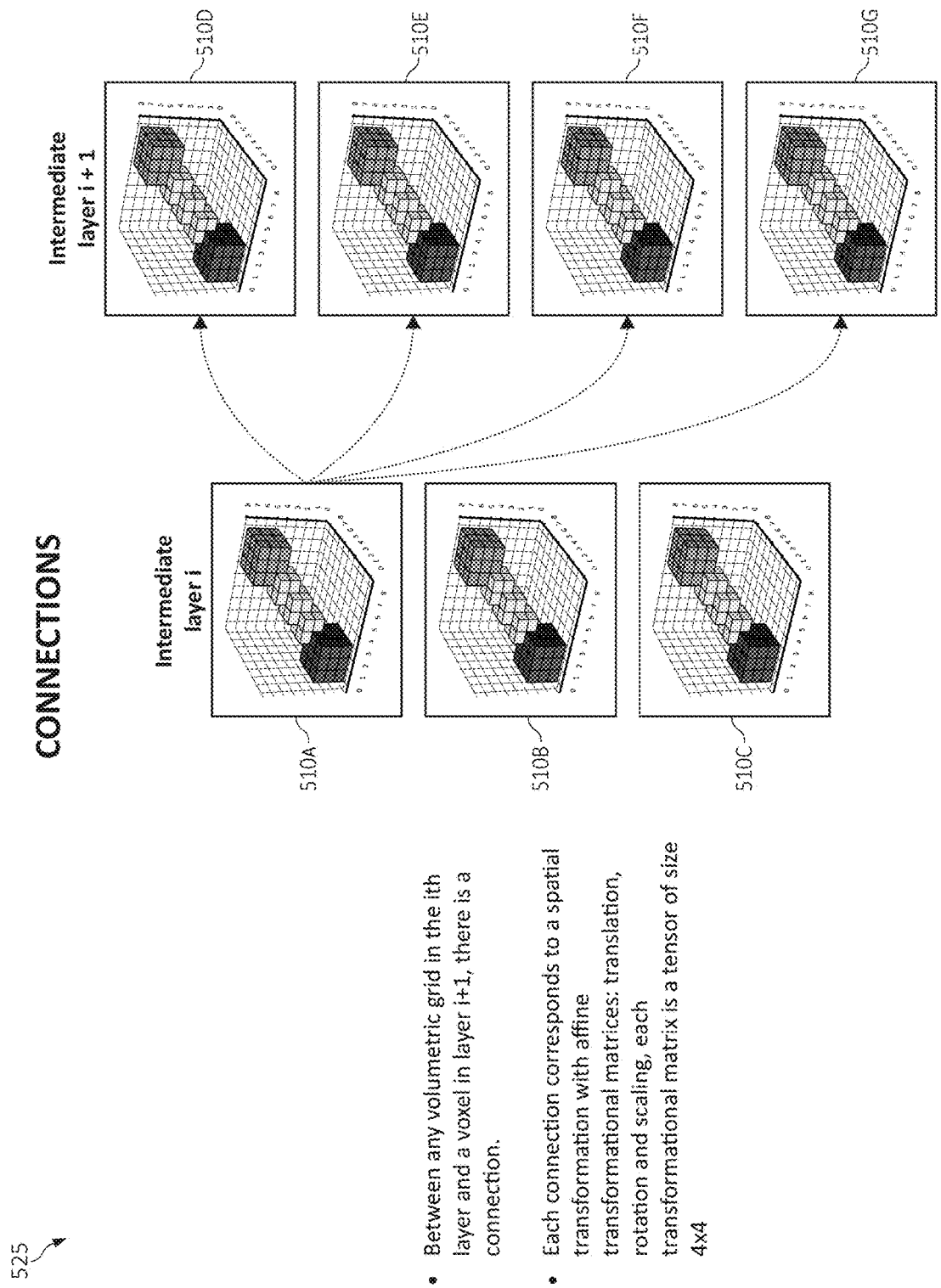
Figure 5E:
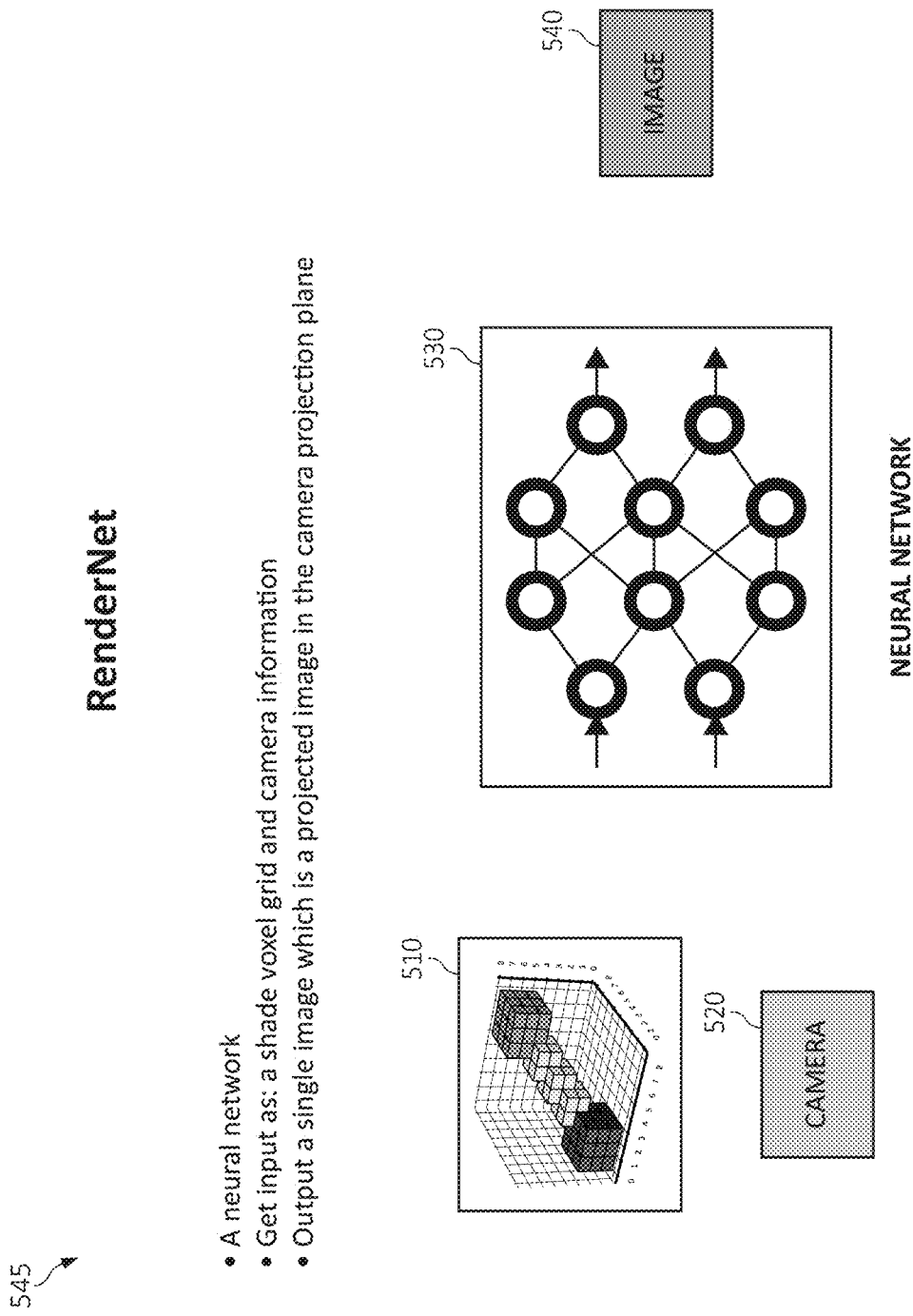
FIG. 5E-5F are block diagrams of an exemplary neural network operation according to an embodiment of the present invention.
Figure 5F:
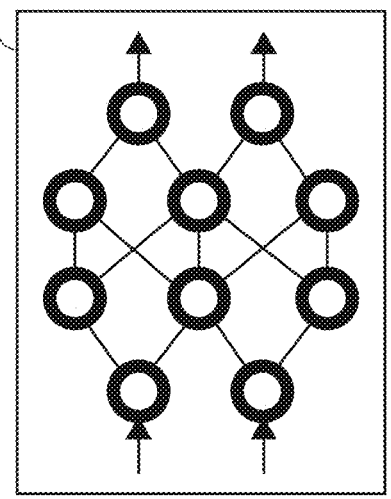
Figure 5F:
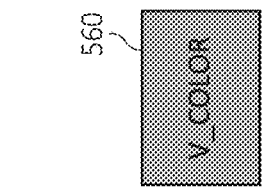
Figure 5F:
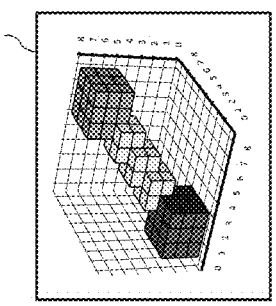
Figure 5F:
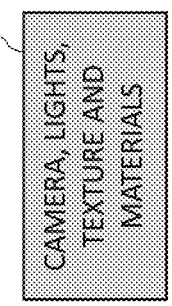

To further illustrate the components of FIGS. 4A-4B, consider now the follow depictions an exemplary 3D visual alphabet 500 in FIG. 5A, intermediate layers 515 of FIG. 5B, connections 525 of FIG. 5C, spatial transformations 535 of FIG. 5D, renderer 545 of FIG. 5E, a shader 555 of FIG. 5F according to one or more embodiments of the present invention.

As depicted in FIG. 5A, the 3D visual alphabet 500 is a set of volumetric grids (e.g., voxel grids) that may be learned and each volumetric grid is a 4D tensor of a selected size (e.g., height ("H"), weight ("W"), dimension ("D"), and color ("C").

The intermediate layers 515 of FIG. 5B illustrate a plurality of intermediate layers (and/or final layers) such as, for example, intermediate layers 510A-510G, which may be one or many intermediate volumetric grids or final volumetric grids used to keep intermediate results under spatial transformations. A volumetric grid is a 3D tensor. That is, each intermediate layer 510A-G may include one or more intermediate volumetric grids. In one aspect, the final layer may be a single volumetric grid in the last layer representing the 3D scene in the camera space.

Turning now to the connections 525 of FIG. 5C and the spatial transformations 535 of FIG. 5D, the connections 525 connects (e.g., the line/arrows) between two volumetric grid in two consecutive layers there is one connection. The connections 525 are a spatial transformer that transforms one volumetric grid (e.g., intermediate layer 510A-G) into another one with a set of affine transformation matrices (e.g., scaling, rotation and translation). For example, the spatial transformer may transform intermediate layer 510 into intermediate layer 510D.

The renderer 545 system may include a renderer 530 that (e.g., a RenderNet) is a neural network. The renderer 530 may receive as input a shaded voxel grid 510 and camera information from a camera 520. The renderer 530 may process the information and generate (e.g., output) a single image 540, which may be a projected in the camera projection plane.

The shader system 555 may include a shader 530 (e.g., a ShaderNet) is a neural network. The shader 530 may receive as input a voxel grid 510, camera, lighting, texture and material information 550. The shader 530 may process the information and generate (e.g., output) a single image 540, which may be a single shaded voxel grid 560 (e.g., V_Color) with colors.

The present invention described herein may be applied, for example, to transfer learning (i.e., learned representations may be transferred to other supervises tasks) for visual recognition services, object tracking in videos, and video (and/or image) generation.

Figure 6:
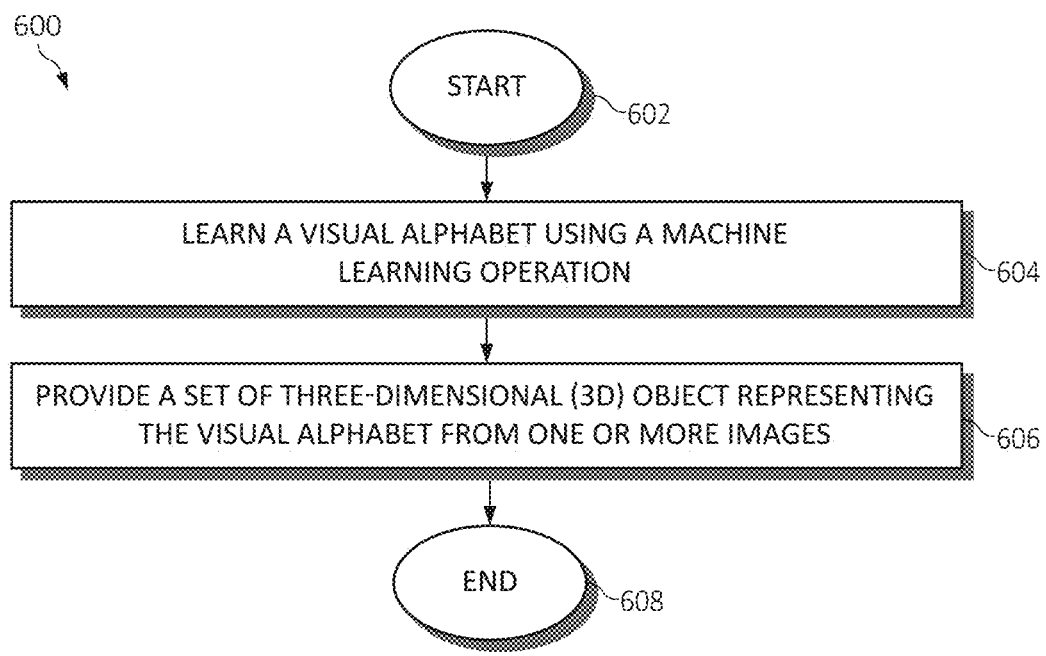
FIG. 6 is a flowchart diagram of an exemplary method for applying intelligent unsupervised learning of three dimensional ("3D") visual alphabets according to an embodiment of the present invention.

Turning now to FIG. 6, a method 600 for providing unsupervised learning of a three dimensional ("3D") visual alphabet in a computing environment is depicted, in which various aspects of the illustrated embodiments may be implemented. The functionality 600 may be implemented as a method executed as instructions on a machine, where the instructions are included on at least one computer readable medium or on a non-transitory machine-readable storage medium. The functionality 600 may start in block 602.

A 3D visual alphabet (e.g., a set of primitives in voxel grid format) may learn using a machine learning operations, as in block 604. A set of 3D objects representing the visual alphabet may be provide from one or more images, as in block 606. The functionality 600 may end in block 608.

In one aspect, in conjunction with and/or as part of at least one block of FIG. 6, the operation of method 600 may include each of the following. The operation of functionality 600 may infer a 3D representation of an input image using the visual 3D alphabet, wherein the visual 3D visual alphabet is as a set of primitives in a voxel grid. The operation of functionality 600 may apply a set of transformations of spatial transformations to transform visual primitives in the visual 3D alphabet and/or use one or more intermediate layers to store intermediate visual primitive transformation results from spatial transformation, wherein one or more connections are used between consecutive intermediate layers.

The operation of functionality 600 may transform a volumetric grid to an alternative volumetric grid by applying one or more transformational matrices to one or more voxels, and/or create a 3D image for a selected image by applying according to a defined order a set of compositional transformations of spatial transformations to transform visual primitives in the visual 3D alphabet. The operation of functionality 600 may estimate pose information and object properties and materials of an image.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for intelligent unsupervised learning of visual alphabets in a computing environment in comprising:
    learning a visual three-dimensional (3D) alphabet from one or more images using a machine learning operation;
    providing a set of 3D primitives representing the visual 3D alphabet;
    subsequent to learning the visual 3D alphabet and providing the set of 3D primitives, receiving an input image;
    analyzing the input image using the set of 3D primitives, wherein analyzing the input image includes identifying, using the 3D visual alphabet, a set of compositional transformations of spatial transformations, and an order in which the set of compositional transformations are applied, to transform the set of 3D primitives in the 3D visual alphabet into a 3D scene of the input image; and
    creating a 3D image for the input image according to the set of compositional transformations applied in the identified order.

2. The method of claim 1, further comprising inferring a 3D representation of the input image using the visual 3D alphabet, wherein the visual 3D alphabet is a set of primitives represented as volumetric grids.

3. The method of claim 1, further including using one or more intermediate layers to store intermediate visual primitive transformation results from the spatial transformations, wherein one or more connections are used between consecutive intermediate layers.

4. The method of claim 1, further including transforming a volumetric grid to an alternative volumetric grid by applying one or more transformational matrices to one or more voxels.

5. The method of claim 1, further comprising estimating pose information and object properties and materials of the input image.

6. A system for intelligent unsupervised learning of visual alphabets in a computing environment, comprising:
    one or more computers with executable instructions that when executed cause the system to:
    learn a visual three-dimensional (3D) alphabet from one or more images using a machine learning operation;
    provide a set of 3D primitives representing the visual 3D alphabet;
    subsequent to learning the visual 3D alphabet and providing the set of 3D primitives, receive an input image;
    analyze the input image using the set of 3D primitives, wherein analyzing the input image includes identifying, using the 3D visual alphabet, a set of compositional transformations of spatial transformations, and an order in which the set of compositional transformations are applied, to transform the set of 3D primitives in the 3D visual alphabet into a 3D scene of the input image; and
    create a 3D image for the input image according to the set of compositional transformations applied in the identified order.

7. The system of claim 6, wherein the executable instructions infer a 3D representation of the input image using the visual 3D alphabet, wherein the visual 3D alphabet is a set of primitives represented as volumetric grids.

8. The system of claim 6, wherein the executable instructions use one or more intermediate layers to store intermediate visual primitive transformation results from the spatial transformations, wherein one or more connections are used between consecutive intermediate layers.

9. The system of claim 6, wherein the executable instructions transform a volumetric grid to an alternative volumetric grid by applying one or more transformational matrices to one or more voxels.

10. The system of claim 6, wherein the executable instructions estimate pose information and object properties and materials of the input image.

11. A computer program product for providing intelligent unsupervised learning of visual alphabets in a computing environment by a processor, the computer program product comprising a non-transitory computer-readable storage medium having computer-readable program code portions stored therein, the computer-readable program code portions comprising:
    an executable portion that learns a visual three-dimensional (3D) alphabet from one or more images using a machine learning operation;
    an executable portion that provides a set of 3D primitives representing the visual 3D alphabet;
    an executable portion that, subsequent to learning the visual 3D alphabet and providing the set of 3D primitives, receives an input image;
    an executable portion that analyzes the input image using the set of 3D primitives, wherein analyzing the input image includes identifying, using the 3D visual alphabet, a set of compositional transformations of spatial transformations, and an order in which the set of compositional transformations are applied, to transform the set of 3D primitives in the 3D visual alphabet into a 3D scene of the input image; and
    an executable portion that creates a 3D image for the input image according to the set of compositional transformations applied in the identified order.

12. The computer program product of claim 11, further including an executable portion that infers a 3D representation of the input image using the visual 3D alphabet, wherein the visual 3D alphabet is a set of primitives represented as volumetric grids.

13. The computer program product of claim 11, further including an executable portion that
    uses one or more intermediate layers to store intermediate visual primitive transformation results from the spatial transformations, wherein one or more connections are used between consecutive intermediate layers.

14. The computer program product of claim 11, further including an executable portion that transforms a volumetric grid to an alternative volumetric grid by applying one or more transformational matrices to one or more voxels.

15. The computer program product of claim 11, further including an executable portion that estimates pose information and object properties and materials of the input image.

* * * * *